United States Patent [19]
Whitt

[11] Patent Number: 4,881,243
[45] Date of Patent: Nov. 14, 1989

[54] SIGNAL TIMING CIRCUITS

[75] Inventor: Steven Whitt, Ipswich, England

[73] Assignee: British Telecommunications public limited company, United Kingdom

[21] Appl. No.: 741,881

[22] Filed: Jun. 6, 1985

[30] Foreign Application Priority Data

Jun. 7, 1984 [GB] United Kingdom ............... 8414517

[51] Int. Cl.$^4$ .............................................. H04L 7/02
[52] U.S. Cl. ..................................... 375/4; 328/155; 375/119; 375/120
[58] Field of Search ....................... 375/3, 4, 106, 111, 375/113, 118, 119, 120; 360/51; 328/72, 74, 155, 164, 55; 370/55, 75

[56] References Cited

U.S. PATENT DOCUMENTS

| | | | |
|---|---|---|---|
| 3,546,383 | 12/1970 | Lyon | 370/75 |
| 3,617,774 | 1/1971 | Crouse | 328/155 |
| 3,778,550 | 12/1973 | David et al. | 375/119 |
| 3,781,470 | 12/1973 | Horn | 328/155 |
| 3,820,034 | 6/1974 | Ball | 328/164 |
| 3,908,091 | 9/1975 | Waldeck | 328/164 |
| 3,984,777 | 10/1976 | Noguchi | 375/119 |
| 3,986,126 | 10/1976 | Gindi et al. | 375/106 |
| 3,992,581 | 11/1976 | Davis | 375/3 |
| 3,993,952 | 11/1976 | Roza | 375/4 |
| 4,012,591 | 3/1977 | Sailer et al. | 375/119 |
| 4,384,358 | 5/1983 | Shiki et al. | 375/100 |
| 4,385,396 | 5/1983 | Norton | 375/110 |
| 4,393,279 | 7/1983 | Cochrane et al. | 375/3 |

FOREIGN PATENT DOCUMENTS 3017237 11/1981 Fed. Rep. of Germany .
2473235 7/1981 France .

OTHER PUBLICATIONS

IEE 1982 Ultrasonics Symposium, 27–29 Oct. 1982, San Diego, CA. New York (U.S.), Rosenberg et al.: "Optical Fiber Repeatered Transmission Systems Utilizing Saw Filters", pp. 238–246.

Primary Examiner—Benedict V. Safourek
Attorney, Agent, or Firm—Nixon & Vanderhye

[57] ABSTRACT

A signal timing circuit for use in re-timing circuits in digital signal regenerators in long distance telecommunications systems is disclosed. A phase control circuit controls the timing of clock signal relative to digital signals at a re-timing gate by means of a negative feedback loop and a phase shifter. The feed back loop maintains the desired relative timing in dependence upon a reference voltage ($V_{ref}$) and a voltage ($V_{var}$) obtained from the phase difference of the input digital signals ($\phi_i$) and the output digital signals ($\phi_o$) of the re-timing gate.

36 Claims, 4 Drawing Sheets

SIGNAL TIMING CIRCUITS

This invention relates to signal timing circuits, and in particular to circuits for controlling the timing of digital signals.

BACKGROUND AND SUMMARY OF THE INVENTION

Transmission, storage or processing of digital signals is most commonly performed with the aid of signal formats in which the data element, either a digital value or a change in digital value, is represented by the occurrence or absence at a pre-defined position in time of a signal. The signal may, for example, be a pulse or a transition. The signal positions in time are defined with reference to regular clock signals or, in other words, as the relative phase there between. Many of the commonly used signal formats are self-clocking, which is to say they lack dedicated clock signals and, instead, the clock information is conveyed by the data signal sequence itself.

For correct extraction of the data information conveyed by the digital signals the correct phase relationship between the clock signals and the data signals is essential. In the course of transmission, this phase relationship may, however, be degraded as may be the shape and magnitude of the digital signals. The main causes, among others, of signal degradation are noise, dispersion and bandwidth restrictions on the transmission channel, and the signal needs to be restored prior to, for example, processing, error correction or, especially in long distance telecommunications systems, onward transmission from a repeater or regenerator.

Conventionally the restoration of the correct signal timing has been accomplished by extracting the clock signals from the digital signal sequence, and applying the recovered clock signals to clock the data signals through an appropriate gate. A variety of methods exist for performing the clock signal extraction, such as, for example, passive extraction with the aid of appropriate filters, or active extraction with phase-lock loops employing voltage controlled oscillators. In order for the clock signal to be applied to the gate with the correct phase relative to the data signal it is necessary to compensate for signal delays in the clock extraction circuits. Heretofore, compensation has conventionally been achieved by providing a delay line, such as a co-axial delay line, between the clock extraction circuit and the gate. As the delay in the clock extraction circuit varies from circuit to circuit, such delay lines have to be individually matched to each circuit during manufacture. Not only is this time-consuming and costly in terms of labour, but also no facility exists to compensate for the effect of short term temperature variations, long term ageing effects, and the like.

Timing recovery circuits for repeaters, their requirements and conventional solutions thereto, are conveniently summarised in R. L. Rosenber et al. "Optical Fiber Repeatered Transmission Systems Utilizing SAW Filters", Proc. IEEE Ultrasonics Symposium 1982, Vol.1 pp238-246.

It is an object of the present invention to provide a timing control circuit which avoids, or at least mitigates some of the aforementioned shortcomings of the conventional techniques.

It is another object of the present invention to provide an improved signal retiming circuit for digital signals.

According to one aspect of the present invention, a retiming circuit for digital signals comprises means to derive timing signals, phase adjusting means to adjust the phase of the timing signals, gating means to gate digital signals with the phase adjusted timing signals to generate re-timed digital signals, and means to control the phase adjusting means including negative feedback means responsive to the phase difference between the timing signals and the digital signals. The phase difference between timing and digital signals is conveniently measured by detecting the phase difference between the digital signals and the re-timed digital signals.

Preferably, the feedback means are responsive also to a reference signal.

The timing signals may be regular clock signals. The clock signals may be obtained by extraction from the digital signals. The extraction may be passive using, for example, filters such as surface acoustic wave (SAW) filters, which isolate the clock signal component of the digital signals; or extraction may be active using, for example, phase-lock loops provided with variable frequency oscillators running in synchronism with the clock signal component of the digital signals.

Alternatively, the timing signals may be a second sequence of digital signals differing from said digital signals in phase. The present invention may then be employed to synchronize the phases of, or compare, two nominally identical signal sequences.

According to a further aspect of the present invention, a regenerator for a long distance digital telecommunications system includes a re-timing circuit for received digital signals, means to generate a local clock signal sequence of a frequency commensurate with the clock frequency of the received digital signals, phase adjusting means to adjust the phase of the local clock generating means, a re-timing gate to gate the received digital signals with the local clock signals so as to provide re-timed digital signals, and means to control the clock signal phase adjusting means, wherein the control means comprise a negative feedback loop to maintain the phase relationship between the clock signals and the re-timed data signals at a value determined by a reference signal. The means for adjusting the phase of the timing signals or the clock signals conveniently comprise a phase shifter.

The relative timing or phase difference, of the (un-retimed) digital signals or the clock signals, and the re-timed digital signals may be sensed with a phase detector circuit. The phase detector may be of a conventional type. However, where the phase difference between the un-retimed and the re-timed digital signals is employed then, as the retimed digital signals are always delayed relative to the un-retimed signals and no ambiguity can therefore arise as to their sequence in time, the phase detector may conveniently operate over $4\pi$ radians of phase angle rather than being restricted to the usual $2\pi$ radians of phase angle.

The reference signal may be provided by a controlled current or voltage source. Preferably, however, at least one component of the reference signal is generated from the digital signals. This may be accomplished, for example, by employing a fixed delay line of arbitrary delay time, feeding the sequence of digital signals together with the same sequence of digital signals delayed in that delay line to a further phase-detector circuit, and integrating over time the output signal of the phase detector circuit.

BRIEF DESCRIPTION OF THE DRAWINGS

The present invention will now be described further by way of selected embodiments illustrated with the aid of the accompanying drawings of which.

DESCRIPTION OF THE PREFERRED EMBODIMENTS

Figures 1, 5:
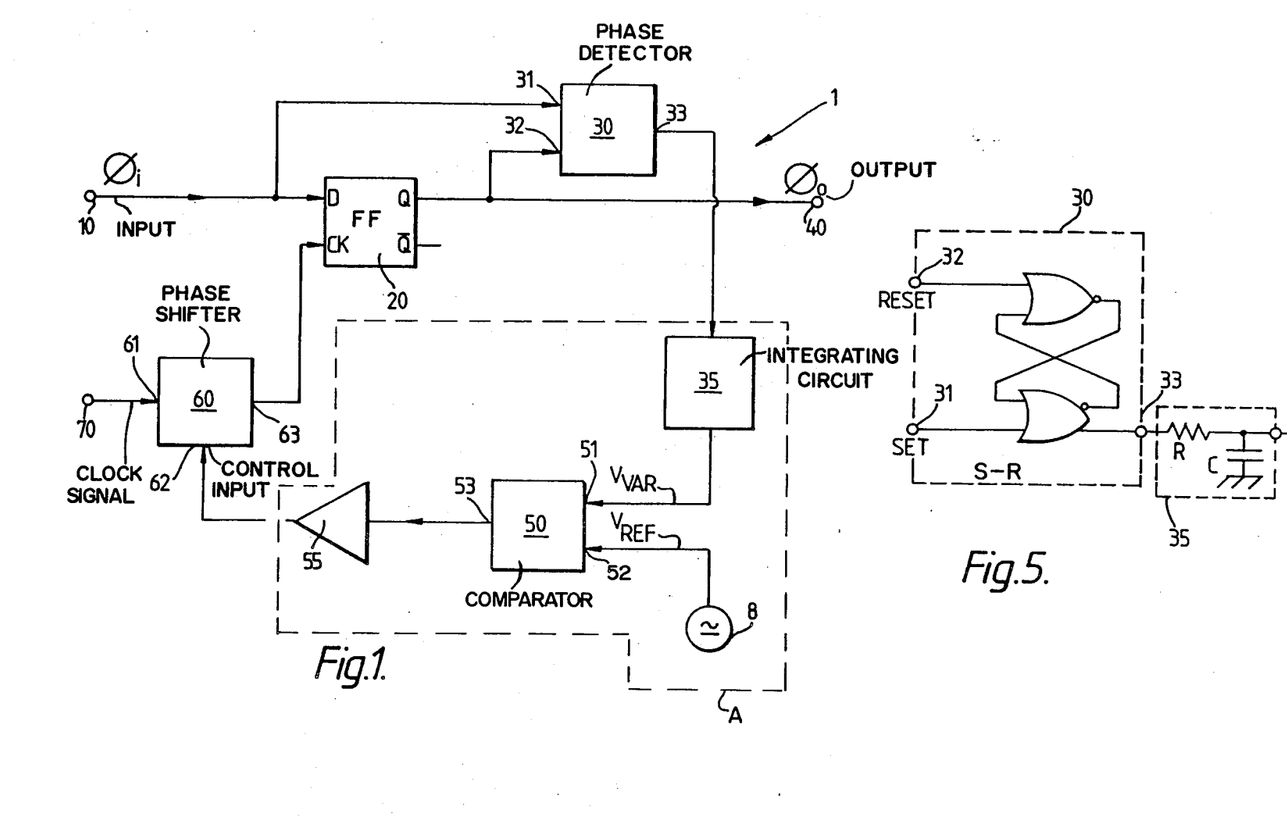
FIG. 1 is a block diagram of a timing control circuit in accordance with the present invention.
FIG. 5 is a circuit diagram of a phase detector and phase error signal integrator for the circuit of FIG. 1.

Referring now also to the drawings, FIG. 1 shows in block diagram form a timing control circuit 1 for retiming non-return-to-zero (NRZ) binary digital signals $\phi_i$. The circuit 1 comprises a retiming gate 20, a source 8 of a reference voltage $V_{ref}$ (which may include low frequency modulation as denoted by the ac symbol), and a negative feed-back loop (30 to 60).

The retiming gate is provided by an edge-triggered D-type flip-flop 20 connected with its data input D to an input terminal 10 for digital signals. The data output terminal Q of the flip-flop 20 is connected to a re-timed signal output terminal 40.

Also connected to the input terminal 10 and the output terminal 40 are inputs 31 and 32 respectively of a phase detector 30. Output 33 of the phase detector 30 is connected to the input of an integrating circuit 35 which integrates over time the phase error signal appearing at the output 33 of the phase detector 30 to provide the voltage $V_{var}$ applied to a first input 51 of a comparator 50.

Applied to a second input 52 of the comparator 50 is the reference voltage $V_{ref}$ supplied by the reference voltage source 8. The output signal of the comparator 50 at output 53 is amplified in a feedback amplifier 55 and applied to control input 62 of an electronic phase shifter 60. To signal input 61 of the phase shifter 60 is applied from clock signal input terminal 70 a regular clock signal with a frequency corresponding to twice the bit-cell rate of the NRZ binary signal $\phi_i$ applied to the input terminal 10 of the circuit 1. The clock signal is applied via the phase shifter 60 to the clock terminal CK of the flip-flop 20 to gate the NRZ signal $\phi_i$.

The phase detector 30, integrator 35, comparator 55 and feed-back amplifier 55, and phase shifter 60 together form a negative feedback loop which, as will be further explained below, acts to maintain the retimed NRZ signals in a predetermined phase relationship to the clock signal.

In operation the circuit shown in block diagram form in FIG. 1 enables the phase of the un-retimed data signals $\phi_i$ to be accurately maintained with respect to the clock signals. Incoming NRZ binary signals $\phi_i$, after having passed through a level decision circuit if appropriate, are applied via the input terminal 10 to the D input of the D-type flip-flop 20, and to the input 31 of the phase detector 30. The clock signal to clock the data signal at input D to output Q, is applied to the clock input CK of the D-type flip-flop 20 via a voltage controlled phase shifter 60. The amount of phase shift applied by the phase shifter 60 to the clock signal depends on the output voltage from the comparator 50. The output voltage of the comparator 50 is itself determined by the difference between the variable voltage $V_{var}$ and the reference voltage $V_{ref}$ which are applied to inputs 51 and 52 respectively of the comparator 50.

The variable voltage $V_{var}$ input to the comparator is provided by integrating over time in the integrator 35 the phase error output signal from the phase detector 30, the instantaneous value of which is commensurate with the phase difference between the un-retimed and the retimed binary signals at the D input and the Q output of the flip-flop 20.

As shown in FIG. 5, the phase detector 30 may comprise a conventional Set-Reset flip-flop consisting of a pair of cross-linked OR/NOR gates. Input 31 of the flip-flop 30 is the SET terminal which, on application of a positive going (leading) edge, say, of the un-retimed NRZ signal $\phi_i$, sets the flip-flop, thereby causing the output 33 to go high. On application of the subsequently occurring corresponding leading edge of the retimed NRZ signal $\phi_o$ to the RESET terminal 32, the output 33 goes low. The cross-linking of the two logic OR/NOR gates holds the output 33 at the level corresponding to the last applied of the SET or RESET signals.

Figure 2:
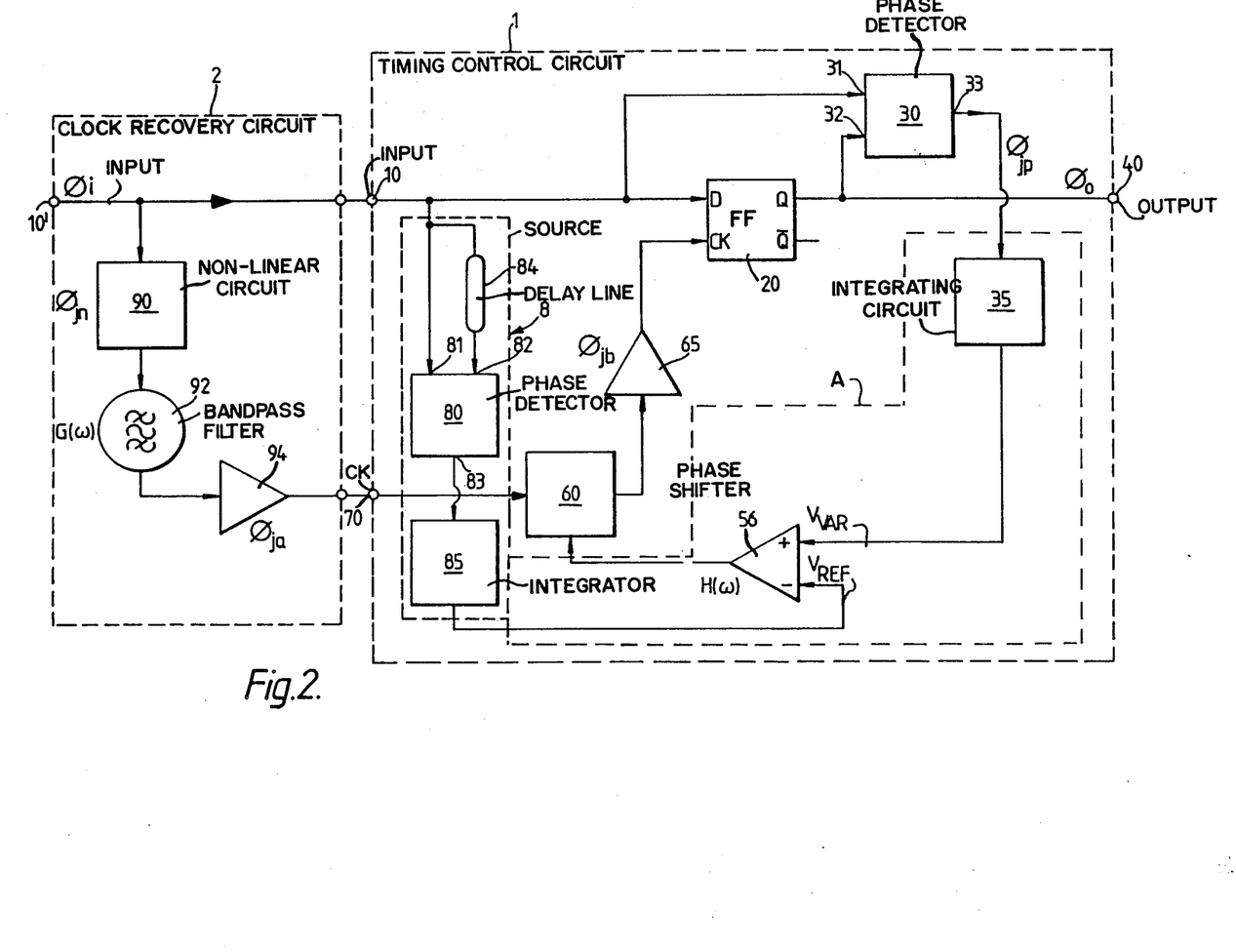
FIG. 2 is a block diagram of a retiming circuit employing a modified form of the timing control circuit of FIG. 1.

FIG. 2 is a block diagram of a practical implementation of the present invention in a retiming circuit for NRZ binary digital signals. The circuit shown in FIG. 2 consists of a timing or clock recovery circuit 2, and a timing control circuit 1.

The clock recovery or extraction circuit 2 comprises an input terminal 10' which is connected straight through to the input terminal 10 of the timing control circuit 1, and to the input of a non-linear circuit 90. The function of the non-linear circuit 90, which may be a squaring circuit multiplying the NRZ signal with a delayed version of itself, is to recover the clock frequency. However, other, neighbouring, spectral components are also recovered, and the output signal of the non-linear circuit 90 is applied to the input of a passive high Q bandpass filter 92 to eliminate all unwanted spectral components, thereby to provide a spectrally (relatively) pure clock signal.

The conflicting requirements imposed by, on the one hand, the need for a filter bandwidth as narrow as possible to obtain a spectrally pure clock signal and, on the other hand, the need for a wide bandwidth to accommodate minor variations in the clock frequency of the received NRZ signals, have been found in practice to be satisfied by a surface acoustic wave (SAW) filter having a Q-value of the order of 150. Other filters of similarly appropriate characteristics, for example R/C/L filters or crystal filters, may be used instead of SAW filters.

The output of the SAW filter 92 is amplified in an amplifier 94 and applied to the clock input 70 of the timing control circuit 1.

The timing control circuit 1 of FIG. 2 shows a practical implementation of the circuit 1 of FIG. 1 in somewhat more detail, but is otherwise substantially identical with the circuit of FIG. 1. Corresponding components in FIGS. 1 and 2 are labelled with the same reference numerals.

In particular, circuit 1 of FIG. 2 shows in greater detail a preferred circuit arrangement for the source 8 of the reference voltage $V_{ref}$, which comprises a phase detector 80, a delay line 84, and an integrator 85. The reference voltage source 8 of FIG. 2 is suitable for providing a reference voltage $V_{ref}$ from an NRZ binary signal sequence applied to terminal 10 of the timing control circuit 1. The two inputs 81 and 82 of the phase detector 80 receive, respectively, an undelayed and a delayed binary NRZ signal sequence $\phi_i$ applied to the terminal 10 of the circuit 1. The delay provided by delay line 84 may be arbitrarily chosen. Its only function is to cause the phase detector 80 to provide a phase error signal at output 83 which after integration over time in the integrator 85 has a steady DC value. As the delay line causes a constant delay between the input NRZ signal at terminals 81 and 82, irrespective of the signal sequence $\phi_i$, the phase detector output will be the same for all transitions in the applied signal. In an NRZ signal transitions occur randomly at multiples of the bit cell time. Therefore, provided the integration in integrator 85 is over a sufficiently long time period and hence over a sufficient number of bits to ensure statistical equilibrium the output of the integrator 85 is a substantially constant DC voltage.

The DC voltage $V_{ref}$ so generated is applied to the inverting input of a differential amplifier 56 which fulfills the combined function of comparator 50 and feedback amplifier 55 of FIG. 1, and the output signal of which is applied to the phase shifter 60. In the case of the circuit 1 of FIG. 2, the clock signal emerging from the phase shifter 60 is once more amplified in amplifier 65 before being applied to the clock input CK of the flip-flop 20.

It should be noted, however, that further in response to temperature fluctuations, ageing of components etc. further means (not shown) may be provided to control the reference voltage in such manner that the clock signal has the desired phase relationship to the data signal.

Figure 3A:
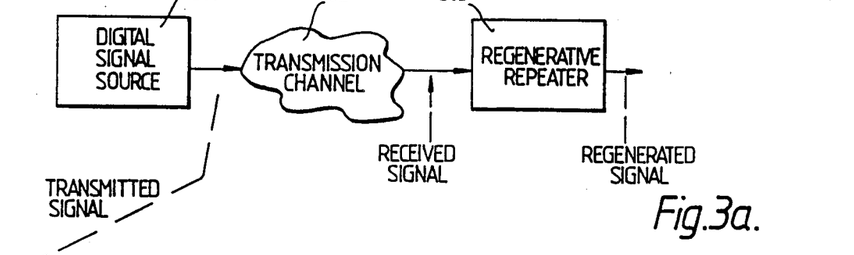
FIGS. 3 and 4 illustrate some aspects of the description of the operation of the circuits of FIGS. 1 and 2.
Figures 3B, 3C:
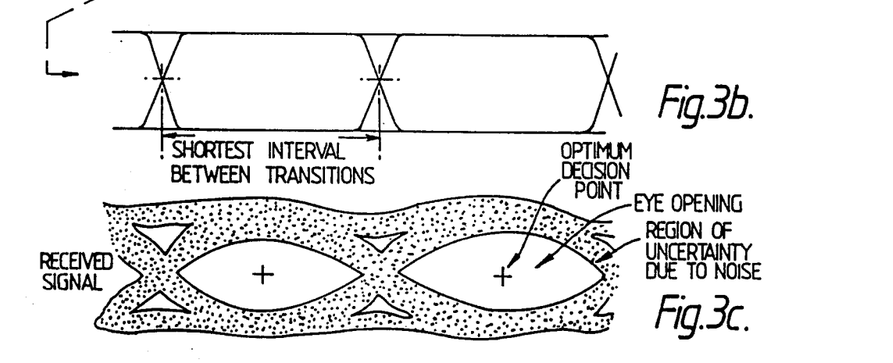
Figure 3D:
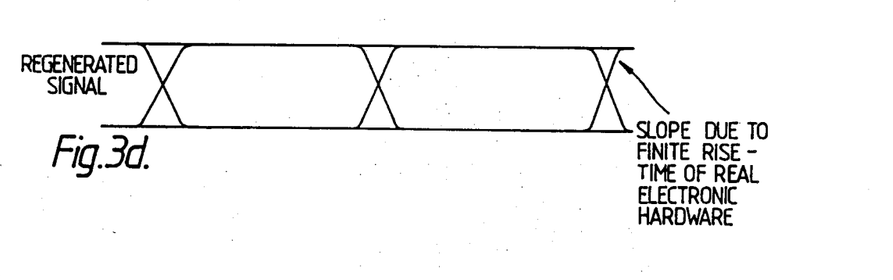
Figures 4A, 4B:
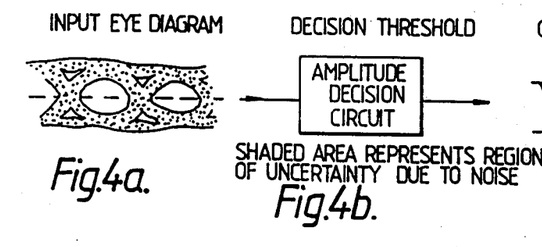

It may be helpful for understanding the operation of the retiming circuit of FIG. 2 to review briefly with the aid of FIGS. 3 and 4 the problems that give rise to the need for the retiming of digital data signals.

During transmission of digital information via a transmission channel, such as for example from transmitter 301 via transmission channel 302 to a repeater 303 of FIG. 3a, binary signals, i.e. pulses or transitions representing binary digits, may suffer impairment in their amplitude as well as their position relative to the nominal position in time as defined in relation to a clock signal. The usual causes for these impairments are noise, dispersion, and bandwidth restrictions on the transmission channel. A technique commonly used to observe these impairments employs so-called "eye-diagrams" which give a graphical indication of amplitude and timing margins of the signal. Eye-diagrams are obtained by superimposing (on an oscilloscope, for instance) all possible pulse sequences occurring in the data stream. The nominal horizontal opening of the eye, as shown in FIG. 3b corresponds to the shortest interval between transitions, while the maximum vertical separation corresponds to the nominal pulse height. As illustrated by FIG. 3c, the eye-opening observed in practice is of a decreased size both horizontally and vertically on account of the aforementioned impairments. The reduction in vertical opening is due to loss of signal amplitude, that in horizontal opening due to jitter, i.e. pulses having shifted from their nominal positions. The eye opening actually observed defines a boundary within which no wave form trajectories exist under any condition. Clearly, the larger the eye-opening the less is the signal impairment.

Figure 4C:
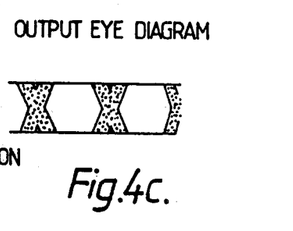

In order to make a received signal suitable for retransmission or processing in the digital regenerator 303, say, the observed impairments of the signal need to be corrected by the regenerator. As illustrated by FIG. 4, ambiguity in signal amplitude is eliminated by using a level decision circuit to decide the logic level of the signal. The signal at the output of the level decision circuit has well defined logic levels but the timing of the transition is still poorly defined as indicated by the shaded areas in FIG. 4c.

Misalignment of the clock signal with respect to the data signal as illustrated by the eye diagram of FIG. 3c, could lead to errors in data detection, and retiming of the digital binary signals is required to avoid this kind of error.

As previously mentioned, the clock signal is recovered in the clock extraction circuit 2 of FIG. 2. Although it is possible to recover very accurately the clock signal frequency from the NRZ signal, the correct phase relationship between the clock and the data signal is lost in the recovery process. In the past, the correct phase relationship was restored by inserting a delay line of fixed delay in between the clock output of the clock recovery circuit 2 and the retiming gate 20. Since the phase delay in the clock recovery circuit 2 is critically dependent on the precise parameters of the components making up the circuit, it has in the past been necessary to provide an individually matched delay line for each circuit manufactured, a time consuming and costly process in terms of labour. Moreover, once installed, the delay of the delay line could not be altered to compensate for device ageing and the like, nor could short term variations, e.g. due to temperature fluctuations, be compensated for. The effect of such changes in the circuit behaviour frequently tends to move the position of the clock signal in an arbitrary manner from the centre of the eye-opening, thus resulting in impaired performance.

The timing control circuit provided by the present invention overcomes this problem by providing a negative feedback loop as described above which operates to maintain the desired phase relationship between clock and data signals to a value chosen by the reference voltage $V_{ref}$, whatever short or long term changes occur in the circuit behaviour.

It will be appreciated from the foregoing that, although the delay line value of delay line 84 of FIG. 2 can in principle be chosen arbitrarily, it is advantageous to select a delay line which causes a delay equal to one half the nominal bit period or, which is the same in the case of an NRZ signal, a delay equal to the clock rate. Selecting this delay results in a particularly simple circuit arrangement in that at the nominal clock frequency the voltages $V_{var}$ and $V_{ref}$ will be equal when the clock signal lags the data signal $\phi_i$ by $\pi$ radians. Thus the clock signal will trigger the transfer of the signal value $\phi_i$ from the D input to the Q output of the retiming gate 20 exactly at the midpoint of the eye opening without any further measures to select the correct reference voltage.

It should be emphasized that in contrast to the prior art arrangements described above, the signal delay required from the delay line 84 does not require individual matching to the total phase delay in the clock extraction circuit 2 with consequential savings in cost and labour.

The phase detectors 30 and 80, and the integrators 35 and 85 are preferably identical in configuration and ideally are located on the same integrated circuit chip. By adopting this measure any variation in, for example, temperature will be shared by both circuits. Because of the operation of the feed back loop, any such shared variation will cause an equal but opposite effect on the timing of the clock signal, which thus remains stable.

The action of the feedback loop of circuit 1 will normally be chosen to be relatively slow as compared with for example, the response time of the clock extraction circuit 2. Satisfactory operation at 565 Mbit/s has been obtained by employing circuit elements with bandwidths as follows:

The phase shifter 60 had low pass transfer response for frequencies up to the clock frequency which, for NRZ signals is twice the bit cell frequency. Instead of a low pass response, the phase shifter may have a band pass response centered about the clock frequency.

The control response bandwidth of the phase shifter was about 50 kHz, with values between 10 and 100 kHz having been found suitable.

The phase detector 80 had a bandwidth of at least the transmission rate.

The feedback amplifier (55, or 56) had a bandwidth of the order of 10 kHz and the integrator 35 a bandwidth of the order of 10 Hz.

With these parameters the timing control circuit was found to have only little jitter gain above a frequency of fn/2 and to provide jitter reduction below that frequency, where fn is the natural resonance frequency of the feedback loop. Small jitter gain is clearly of considerable importance in the case of long distance telecommunication links which may have over fifty cascaded repeaters/regenerators.

Because of the low jitter gain, the timing control circuit of the present invention may be used to introduce, via the reference voltage, deliberate phase modulation of the clock rate for the transmission of supervisory or control information to or from remote repeaters. A technique which employs such phase modulation (e.g., via source 8 in FIG. 1) for relaying control information from submarine repeaters is described, for example, in published European patent application 81302381.9, entitled "Improvements in or Relating to Digital Transmission Systems" in the name of the Post Office (or its U.S. counterpart U.S. Pat. No. 3,617,774—Cochrane et al which is hereby incorporated by reference).

In view of this prior art no further description is believed necessary to enable those skilled in the art to demodulate a phase-modulated clock and then remodulate it onto the outgoing re-timed data. Such low frequency phase meodulation is typically used for example, as interrogatory, supervisory or control signals in respect of a signal regenerator.

Figure 6:
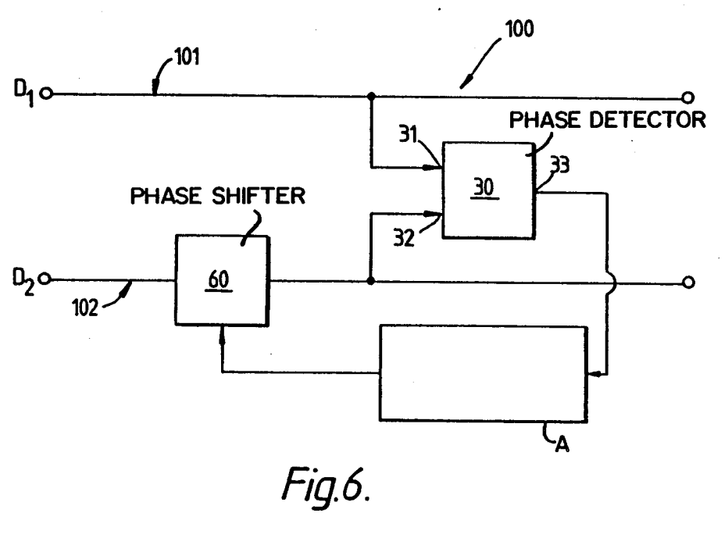
FIG. 6 is a schematic block diagram of a signal comparison and synchronizing circuit employing the present invention.

Referring now to FIG. 6, a circuit 100 employing a timing control circuit in accordance with the present invention comprises a first data path 101, a second data path 102 parallel to the path 101, and a feedback loop (30, 35 to 55 or 56, and 60) which is identical with that of FIGS. 1 or 2 except in that the phase detector receives at inputs 31 and 32 thereof data signals $D_1$ and $D_2$ respectively.

In operation of the circuit 101, nominally identical data signal sequences, which may, for example, be transmitted and locally generated pseudo-random bit sequences, are synchronized (either exactly in phase or with a chosen relative phase delay) by the action of the feedback circuit 30–60, the phase shifter 60 being controlled in the above described manner by the phase error output signal of the phase detector 30.

I claim:

1. A re-timing circuit for digital data signals $\phi_i$ comprising:
   (a) means for extracting timing signals from the digital data signals ($\phi_i$);
   (b) phase adjusting means for adjusting the phase of the timing signals;
   (c) gating means for gating said digital data signals ($\phi_i$) with the timing signals when adjusted by said phase adjusting means, thereby to generate re-timed digital data signals ($\phi_o$); and
   (d) negative feedback control means having a first input connected to receive the digital data signals ($\phi_i$), a second input connected to receive re-timed digital data signals ($\phi_o$) and an output connected to said phase adjusting means and providing at said output a signal representing the phase difference between signals applied to its first and second inputs whereby said negative feedback control means is responsive to the phase difference between the digital data signals ($\phi_i$) and the re-timed digital data signals ($\phi_o$) and said negative feedback control means is adapted to adjust the phase adjusting means so as to maintain a predetermined phase relationship between the timing signals and the digital signals ($\phi_i$).

2. A circuit as claimed in claim 1, wherein the feedback control means are further responsive to a reference signal ($V_{ref}$) which acts to also control the output of the control means used to adjust the phase as a function of the reference signal value ($V_{ref}$).

3. A circuit as in claim 2 wherein a component of the reference signal $V_{ref}$ is derived from the digital data signals.

4. A circuit as claimed in claim 2 wherein at least a component of the reference signal ($V_{ref}$) is derived from the digital signals ($\phi_i$).

5. A circuit as claimed in claim 2 further comprising means for superimposing onto the reference signal ($V_{ref}$) an information signal thereby to phase modulate the timing of the retimed digital signals ($\phi_o$).

6. A circuit as in claim 5 wherein said superimposing means is connected to receive, as said information signal, at least one of interrogatory, supervisory and control signals repeated by a signal repeater.

7. A circuit as claimed in claim 5 wherein said superimposing means is connected to receive, as said information signal, at least one of interrogatory, supervisory and control signals associated with a signal regenerator.

8. A re-timing circuit according to claim 2, which also includes modulation means operatively connected to modulate the reference voltage with supervisory or control information, whereby the re-timed digital data signals ($\phi_o$) are modulated with said supervisory or control information.

9. A circuit as claimed in claim 1 wherein the timing signals are regular clock signals.

10. A circuit as claimed in claim 1 wherein the means for extracting timing signals comprises passive means to extract clock signals from the digital data signals.

11. A circuit as claimed in claim 10 wherein said passive means comprise a non-linear circuit and a high Q filter circuit.

12. A circuit as claimed in claim 11 wherein said high Q filter circuit is a surface acoustic wave filter.

13. A circuit as claimed in claim 10, 11 or 12 wherein said passive means comprises a filter having a Q-value of substantially between 50 and 200.

14. A circuit as claimed in claim 1, wherein the means for extracting timing signals comprises active means for extracting clock signals from the digital data signals.

15. A circuit as claimed in claim 14 wherein said active means comprise a phase-locked loop.

16. A circuit as claimed in claim 1,2,4,5 or 7, arranged to control the phase of clock signals relative to non-return-to-zero code of binary digital signals.

17. A digital signal regenerator for a long-distance telecommunications system comprising a re-timing circuit according to claim 1,2,4,7 or 16.

18. A circuit as claimed in claim 1 wherein said digital data signals comprise a first digital signal sequence and said means for extracting timing signals produces a further digital signal sequence nominally identical to said first sequence.

19. A re-timing circuit according to claim 1, which also includes modulation means operatively connected to the negative feedback control means so as to modulate the phase adjustment means whereby the re-timed digital data signals ($\phi_o$) are phase modulated with said supervisory or control information.

20. A digital data signal re-timing circuit including:
phase detecting means, connected to receive a first input digital datasignal $\phi_i$ at a first input terminal (31) thereof and having a further input terminal (32), for producing at an output terminal (33) thereof a phase error signal responsive to the phase error between said input digital data signal $\phi_i$ and a further digital data signal $\phi_o$ connected to said further input terminal (32);
integrating means coupled to said phase detecting means output terminal (33) for integrating said phase error signal;
phase shifting means, connected to receive a digital timing signal at an input terminal (61) thereof, for shifting the phase of said digital timing signal by an angle responsive to said integrated phase error signal to produce a phase-shifted digital data signal $\phi_o$; and
gating means, connected to receive said first input digital data signal $\phi_i$ and said phase-shifted digital timing signal $\phi_o$, for synchronizing said first input digital data signal $\phi_i$ with said phase-shifted digital timing signal and for applying such a synchronized digital data signal $\phi_o$ to said phase detecting means further input terminal (32).

21. A digital signal re-timing circuit as in claim 20 further including:
reference signal generating means for producing a phase reference signal; and
means, connected to receive said phase reference signal and said integrated phase error signal, for combining said phase reference signal and said integrated phase error signal to produce a composite signal and for controlling the angle said phase shifting means shifts said further input signal in response to said composite signal.

22. A digital signal re-timing circuit as in claim 20 wherein:
said circuit further includes reference signal generating means for producing a phase reference signal; and
said phase shifting means is operatively connected to said reference signal generating means and shifts said further input signal by an angle responsive to both said integrated phase error signal and said phase reference signal.

23. A digital signal re-timing circuit as in claim 22 wherein said reference signal generating means is connected to receive said first input signal and comprises means for deriving a phase reference signal from said first input signal.

24. A digital signal re-timing circuit as in claim 20 wherein said digital timing signal is a periodic clock signal extracted from said first input signal $\phi_i$, and said circuit further includes:
means connected to said first input signal for delaying said input signal by a fixed time period approximately equal to one-half the nominal bit period of said first input signal;
further phase detecting means, connected to receive said first input signal and said delayed first input signal, for producing a further phase error signal responsive to the phase difference between said delayed and undelayed first input signals;
further integrating means for integrating said further phase error signal; and
means for producing a control signal responsive to the relative levels of said integrated further phase error signal and said integrated first-mentioned phase error signal, said phase shifting means being connected to receive said control signal and controlling said phase shift angle in response to said control signal.

25. A digital signal re-timing circuit as in claim 20 wherein said phase detecting means produces said phase error signal in response to the phase difference between said first input signal $\phi_i$ and said synchronized first input signal.

26. A digital data signal regenerating circuit including:
gating means, connected to receive an input digital data signal $\phi_i$ at an input terminal thereof and a clock control signal at a control terminal thereof, for synchronizing said input data signal with said clock control signal and for producing a clock synchronized data signal $\phi_o$ at an output terminal thereof;
phase detecting means, connected to receive said input digital data signal $\phi_i$ and said synchronized data signal $\phi_o$ for producing a phase error signal responsive to the phase error between said input data signal $\phi_i$ and said synchronized data signal $\phi_o$;
synchronization control means, connected to receive said phase error signal at an input thereof, for producing said periodic clock control signal at an output thereof, for controlling the timing of said clock control signal relative to said input digital signal $\phi_i$ in response to said phase error signal, and for applying said clock control signal to said gating means control terminal;
wherein said synchronization control means includes means for producing a phase reference signal and means for combining said phase error signal with said phase reference signal to produce said periodic control signal; and
wherein said synchronization control means further includes phase shifting means, connected to receive a timing signal extracted from said input digital data signal, for phase shifting said timing signal in response to said combined phase error and phase reference signals and for applying said phase shifted timing signal to said gating means as said periodic clock control signal.

27. A digital signal regenerating circuit as in claim 26 wherein said phase reference signal producing means is connected to receive an information signal and includes means for phase modulating said phase reference signal with said information signal.

28. A method of regenerating a digital signal comprising the steps of:
   (1) receiving an input digital signal $\phi_i$;
   (2) synchronizing said input signal with a control signal so as to produce a synchronized version $\phi_o$ of said input signal;
   (3) producing a phase error signal responsive to the phase error between said input signal $\phi_i$ and said synchronized version $\phi_o$ of said input signal; and
   (4) producing said control signal in response to said phase error signal, by
      (a) integrating said phase error signal;
      (b) producing a phase reference signal;
      (c) modifying said phase error signal with said phase reference signal;
      (d) receiving a periodic clock signal associated with said input signal; and
      (e) shifting the timing of said periodic clock signal in response to said modified phase error signal to produce said control signal.

29. A re-timing circuit for digital signals $\phi_i$ comprising:
   (a) means for providing timing signals;
   (b) phase adjusting means for adjusting the phase of the timing signals;
   (c) gating means for gating digital signals ($\phi_i$) with the timing signals when adjusted by said phase adjusting means, thereby to generate re-timed digital signals ($\phi_o$); and
   (d) negative feedback control means having a first input connected to receive the digital signals ($\phi_i$), a second input connected to receive re-timed digital signals ($\phi_o$) and an output connected to said phase adjusting means and providing at said output a signal representing the phase difference between signals applied to its first and second input whereby said negative feedback control means is responsive to the phase difference between the digital signals and said negative feedback control means is adapted to adjust the phase adjusting means so as to maintain a predetermined phase relationship between the timing signals and the digital signals;
   wherein the feedback control means are further responsive to a reference signal ($V_{ref}$) which acts to also control the output of the control means used to adjust the phase as a function of the reference signal value ($V_{ref}$);
   means for superimposing onto the referenced signal ($V_{ref}$) an information signal thereby to phase modulate the timing of the retimed digital signals ($\phi_o$); and
   wherein said superimposing means is connected to receive, as said information signal, at least one of interrogatory, supervisory and control signals produced by a signal regenerator.

30. A retiming circuit for digital signals $\phi_i$ comprising:
   (a) means for providing timing signals;
   (b) phase adjusting means for adjusting the phase of the timing signals;
   (c) gating means for gating digital signals ($\phi_i$) with the timing signals when adjusted by said phase adjusting means, thereby to generate re-timed digital signals ($\phi_o$); and
   (d) negative feedback control means having a first input connected to receive the digital signals ($\phi_i$), a second input connected to receive re-timed digital signals ($\phi_o$) and an output connected to said phase adjusting means and providing at said output a signal representing the phase difference between singals applied to its first and second inputs whereby said negative feedback control means is responsive to the phase difference between the digital signals and said negative feedback control means is adapted to adjust the phase adjusting means so as to maintain a predetermined phase relationship between the timing signals and the digital signals;
   wherein said circuit is arranged to control the phase of clock signals relative to non-return-to-zero coded of binary digital signals.

31. A digital signal regenerator for a long-distance telecommunications system comprising a re-timing circuit for digital signals which includes:
   (a) means for providing timing signals;
   (b) phase adjusting means for adjusting the phase of the timing signals;
   (c) gating means for gating digital signals ($\phi_i$) with the timing signals when adjusted by said phase adjusting means, thereby to generate re-timed digital signals ($\phi_o$); and
   (d) negative feedback control means having a first input connected to receive the digital signals ($\phi_i$), a second input connected to receive re-timed digital signals ($\phi_o$) and an output connected to said phase adjusting means and providing at said output a signal representing the phase difference between signals applied to its first and second inputs whereby said negative feedback control means is responsive to the phase difference between the digital signals and said negative feedback control means is adapted to adjust the phase adjusting means so as to maintain a predetermined phase relationship between the timing signals and the digital signals;
   wherein the feedback control means are further responsive to a reference signal ($V_{ref}$) which acts to also control the output of the control means used to adjust the phase as a function of the reference signal value ($V_{ref}$);

32. A re-timing circuit for digital signals $\phi_i$ comprising:
   (a) means for providing timing signals;
   (b) phase adjusting means for adjusting the phase of the timing signals;
   (c) gating means for gating digital signals ($\phi_i$) with the timing signals when adjusted by said phase adjusting means, thereby to generate re-timed digital signals ($\phi_o$); and
   (d) negative feedback control means having a first input connected to receive the digital signals ($\phi_i$), a second input connected to receive re-timed digital signals ($\phi_o$) and an output connected to said phase adjusting means and providing at said output a signal representing the phase difference between signals applied to its first and second inputs whereby said negative feedback control means is responsive to the phase difference between the digital signals and said negative feedback control means is adapted to adjust the phase adjusting means so as to maintain a predetermined phase relationship between the timing signals and the digital signals;

wherein said digital signals comprise a first digital signal sequence and said means for providing timing signals produces a further digital signal sequence nominally identical to said first sequence.

33. A re-timing circuit for digital signals $\phi_i$ comprising:
 (a) means for providing timing signals;
 (b) phase adjusting means for adjusting the phase of the timing signals;
 (c) gating means for gating digital signals ($\phi_i$) with the timing signals when adjusted by said phase adjusting means, thereby to generate re-timed digital signals ($\phi_o$); and
 (d) negative feedback control means having a first input connected to receive the digital signals ($\phi_i$), a second input connected to receive re-timed digital signals ($\phi_o$) and an output connected to said phase adjusting means and providing at said output a signal representing the phase difference between signals applied to its first and second inputs whereby said negative feedback control means is responsive to the phase difference between the digital signals and said negative feedback control means is adapted to adjust the phase adjusting means so as to maintain a predetermined phase relationship between the timing signals and the digital signals;

wherein the feedback control means are further responsive to a reference signal ($V_{ref}$) which acts to also control the output of the control means used to adjust the phase as a function of the reference signal value ($V_{ref}$);

wherein a component of the reference signal $V_{ref}$ is derived from the digital signals.

34. A digital signal regenerating circuit including:
gating means, connected to receive an input digital signal at an input terminal thereof and a control signal at a control terminal thereof, for synchronizing said input signal with said control signal and for producing said synchronized input signal at an output terminal thereof;
phase detecting means, connected to receive said input digital signal and said synchronized input signal, for producing a phase error signal responsive to the phase error between said input signal and said synchronized input signal; and
synchronization control means, connected to receive said phase error signal at an input thereof, for producing a periodic control signal at an output thereof, for controlling the timing of said control signal relative to said input digital signal in response to said phase error signal, and for applying said control signal to said gating means control terminal;
wherein said synchronization control means includes means for producing a phase reference signal and means for modulating said phase error signal with said phase reference signal to produce said periodic control signal; and
wherein said synchronization control means further includes phase shifting means, connected to receive a timing signal associated with said input digital signal, for phase shifting said timing signal in response to said modulated phase error signal and for applying said shifted timing signal to said gating means as said periodic control signal.

35. A circuit for regenerating a digital data signal, wherein said circuit includes:
 (a) gating means connected to receive a digital data input signal ($\phi_i$) and to produce therefrom a regenerated digital data output signal ($\phi_o$);
 (b) clock means adapted to extract a clock signal (T') from said input signal ($\phi_i$);
 (c) variable phase shifting means connected to said clock means so as to receive the clock signal (T') and adapted to generate therefrom a clock control signal (T'') by shifting the phase of clock signal (T'), said variable phase shifting means being connected to provide said clock control signal (T'') to said gating means whereby the input signal ($\phi_i$) is regenerated under the control of the clock control signal (T'') to produce the said output signal ($\phi_o$);
 (d) phase detecting means connected to receive, at a first input terminal (31), said input signal ($\phi_i$) and, at a second input terminal (32), said output signal ($\phi_o$), said phase detecting means being adapted to produce at an output terminal (33) a phase difference signal ($\phi_D$) responsive to the phase difference between the input signal ($\phi_i$) and the output signal ($\phi_o$); and
 (e) said phase detecting means being connected to said variable phase shifting means so as to control the angle through which clock signal (T') is shifted so as to maintain the value of the phase difference signal ($\phi_D$) at a desired value.

36. A circuit for regenerating a digital data signal, wherein said circuit includes:
 (a) gating means connected to receive a digital data input signal ($\phi_i$) and to produce therefrom a regenerated digital data output signal ($\phi_o$);
 (b) clock means adapted to extract a clock signal (T') from said input signal ($\phi_i$);
 (c) variable phase shifting means connected to said clock means so as to receive the clock signal (T') and adapted to generate therefrom a clock control signal (T'') by shifting the phase of clock signal (T'), said variable phase shifting means being connected to provide said clock control signal (T'') to said gating means whereby the input signal ($\phi_i$) is regenerated under the control of the clock control signal (T'') to produce the said output signal ($\phi_o$);
 (d) phase detecting means connected to receive, at a first input terminal (31), said input signal ($\phi_i$) and, at a second input terminal (32), said output signal ($\phi_o$), said phase detecting means being adapted to produce at an output terminal (33) a phase difference signal ($\phi_D$) responsive to the phase difference between the input signal ($\phi_i$) and the output signal ($\phi_o$); and
 (e) reference phase shifting means connected to receive said input signal ($\phi_i$) and adapted to apply a standarised phase shift thereto;
 (f) second phase detecting means connected to receive as its inputs the input signals ($\phi_i$) and said signal phase shifted by (e), said second phase detecting means being adapted to produce a reference signal which is responsive to the phase difference between its input signals;

(g) comparitor means having a first input terminal connected to said phase detecting means (d) so as to receive as input said phase difference signal ($\phi_D$) and a second input terminal connected to said second phase detecting means (f) so as to receive as input said reference signal, said comparitor being adapted to produce a phase error signal being the difference between said phase difference signal ($\phi_D$) and said reference signal, and (h) the output of said comparitor being connected to said variable phase shifting means so as to control the phase angle through which said lock signal (T') is shifted to maintain said phase error signal at a substantially zero value.

* * * * *